United States Patent [19]
Bortfeld et al.

[11] 3,789,949
[45] Feb. 5, 1974

[54] CERTAIN NEW AND USEFUL IMPROVEMENTS IN OR RELATING TO CONTROL MEANS FOR THE RELEASE OF SAFETY APPLIANCES IN VEHICLES, MORE PARTICULARLY PASSENGER CARRYING AUTOMOBILES

[75] Inventors: Manfred Bortfeld, Eching; Werner Wintershoff; Rainer Anton, both of Munich, all of Germany

[73] Assignee: Bayerische Motoren Werke A.G., Munich, Germany

[22] Filed: July 14, 1972

[21] Appl. No.: 271,875

[30] Foreign Application Priority Data
July 16, 1971  Germany............................ 2135550

[52] U.S. Cl................. 180/91, 180/82 R, 180/82 C
[51] Int. Cl. ........................................... B60r 21/00
[58] Field of Search. 180/82 R, 82 C, 91; 200/82 R, 200/82 D, 83 B, 83 J, 83 W; 293/4

[56] References Cited
UNITED STATES PATENTS
3,654,412  4/1972  Haruna et al......................... 180/91
3,334,204  8/1967  Brenny et al....................... 200/82 R Primary Examiner—Richard E. Aegerter
Assistant Examiner—Joseph E. Valenza

[57] ABSTRACT

Control means for the release of safety appliances for the protection of passengers in motor vehicles comprising a hydraulic activating part and a receiving part co-operating therewith and adapted to operate release means for the safety appliance and secured to a part of the vehicle, said activating part consisting essentially in a casing filled with hydraulic fluid, a piston arranged for axial movement in said casing and adapted to be displaced with a velocity proportional to the degree of deformation to which the vehicle has been subjected, whereby the liquid pressure set up by throttling means on reaching a predetermined minimum value, determined by suitable dimensioning of the throttling means, activates via the receiving part release means for the safety appliance.

1 Claim, 3 Drawing Figures

CERTAIN NEW AND USEFUL IMPROVEMENTS IN OR RELATING TO CONTROL MEANS FOR THE RELEASE OF SAFETY APPLIANCES IN VEHICLES, MORE PARTICULARLY PASSENGER CARRYING AUTOMOBILES

FIELD OF THE INVENTION

The invention relates to control means for the release of safety appliances for the protection of passengers in vehicles more particularly passenger carrying automobiles.

BACKGROUND OF THE INVENTION

Active and passive safety appliances are known for the protection of passengers in motor vehicles. The so-called "active" safety appliances include in the first place seat belts which the passengers of automobiles must fasten before moving off, that is each passenger in the vehicle must be "active" in the way of fastening its own seat belt in order to be protected during travel of the vehicle.

The "passive" protective systems include the so-called "air bag" or "air cushion" systems which is usually housed in the vehicle in front of the passengers in a folded state near the dashboard, the steering wheel, the roof or the like part of the vehicle and is adapted to be inflated automatically above a predetermined speed of impact. The air cushion which is formed in this manner prevents that the vehicle passengers on impact of the vehicle are thrown against the windshield or other hard surfaces of the vehicle. For the control of the inflating means of the air bag or air cushion, spring biased oscillating members are known in which the so-called functioning threshold at which the system becomes operative is determined by the size of the mass of the spring-biased oscillating member, spring constants and the initial tension of the spring means and is reached when a lower critical impact velocity is exceeded. When exceeding this "functioning threshold" by the forces of inertia acting on the control system, contact means are closed and an impulse is initiated for release or inflation of the passive protective system.

The drawbacks of these known control apparatus, which are in the form of spring-biased oscillating masses, reside in that this oscillating mass-sensor is responsive only after certain time delays. Also the oscillating mass, the stiffness of its spring, the initial or pretension of the spring and the path of its oscillations must be determined relative to each other in such a manner that the release contact for the air bag on reaching the "functioning threshold" are instantly closed. As a consequence, at high impact speeds, the control means are released only after a comparatively long period and an extremely short period of time is available for unfolding and inflation of the air bag. In this way, a series of extremely undesirable side effects arise such as an intense explosive sound on inflation of the air bag, a strong rise in the pressure and so on. In addition a delayed impulse to release the control means necessitates that these means are mounted at a place in the vehicle structure which is safe from deformation and up to the giving of the release impulse remain firmly supported and completely ready for action. From this results a further drawback that the control means must be incorporated in a part of the vehicle in which the level of acceleration is reduced by the deformation of the parts in the vehicle structure which are located between the control means and the point of impact.

OBJECT OF THE INVENTION

The object of the invention is to overcome the above mentioned drawbacks of known control means by improving its construction and function as well as its location and installation in the vehicle.

SUMMARY OF THE INVENTION

For solving this problem it is proposed according to the invention that the control means consists of a hydraulic activating part and a receiving part cooperating therewith and adapted to operate release means for the safety appliance, and secured to a part of the vehicle, said activating part consisting essentially in a casing filled with hydraulic fluid, a piston arranged for axial movement in said casing and adapted to be displaced with a velocity corresponding to the velocity of deformation to which the vehicle has been subjected, whereby the liquid pressure set up by the throttling means on reaching a predetermined minimum value determined by suitable dimensioning of the throttling means activates via the receiving part release means for the safety appliance.

Further according to the invention it is proposed that a plurality of control means are arranged as far outwardly as possible in the area of the outer limits of the vehicle and the displacement of the piston in the activating part is essentially directed towards the middle of the vehicle.

According to a constructional embodiment of the invention each control means is located between two parts of the vehicle which are relatively displaced towards each other on impact with a deformation velocity, the activating part and the receiving part being secured by means of an interposed support plate with one vehicle part whilst a piston rod connected to the piston in the activating part axially projects out of the casing of the activating part and is operatively associated with the other vehicle part.

The advantages of the invention over the known control means in which retardation of the vehicle is the criterion for the release of the safety appliance resides principally in that according to the invention the velocity of deformation of a part of the vehicle disposed in the outer periphery of the vehicle acts as criterion for the release of the control means. In this way the release period of the control system is considerably reduced since the parts which are invariably first affected on impact or collision and their velocity of deformation effects the release of the safety appliance. This effect is even made greater as the liquid pressure which is built up in the activating part in front of the piston is proportional to the square of the velocity of deformation. Thus with higher impact speeds, the release time periods from the moment of impact to the point of release of the safety appliance are reduced and thus a progressive rapid response of the control means is achieved. As distinct from known control apparatus for passive protective systems, in which a relatively short time period is available for the unfolding of the protective system, in the construction and arrangement of the control means according to the invention — as a result of the reduced release time — the time period for the unfolding of the protective system can be enlarged that is the pressure and the explosive noise on inflation of the air bag can be kept lower, this being of great importance for the well-being of the vehicle passengers.

A further advantage of the control means according to the invention is that also in the case of an accident involving a locally limited deformation of the vehicle, a trouble proof release impulse is achieved — in contrast to the known control apparatus involving a system of oscillating masses in which the level of acceleration would be too low to effect release of the sensor because the way the apparatus is built in.

Also the existing problem of the premature destruction of the control means during deformation of the vehicle is avoided since according to the invention it is just this deformation which is to give the release impulse of the control means.

A further substantial advantage of the invention over the known control means can be seen in that accidental release of the protective system is made completely impossible for instance as a result of horizontal acceleration during normal operation of the vehicle since in the system of the invention an actual deformation as well as a certain speed of deformation of the vehicle or its parts must actually take place.

It is of particular advantage to incorporate the control means, according to the invention in a bumper system in which hydraulic shock absorbers are arranged on the vehicle body or the like so that on impact at a certain velocity and the displacement of the bumper and the piston rod resulting therefrom, the control apparatus, according to the invention, causes activation of the passive safety appliance.

Further features of the invention will be described in greater detail in the following detailed description of the drawings.

BRIEF DESCRIPTION OF THE DRAWINGS

A preferred form of the invention is illustrated in the accompanying drawings, wherein.

DESCRIPTION OF THE PREFERRED EMBODIMENT

Figure 1:
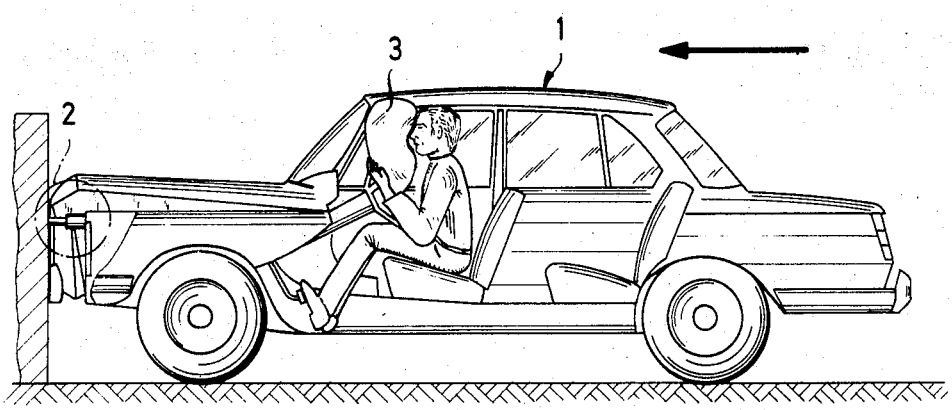
FIG. 1 shows in side view a passenger automobile at the moment of impact with a stationary obstacle.

Referring to the drawings, the passenger automobile 1 shown in FIG. 1 is provided with one or more control means 2 which are located as far forward as possible on the vehicle, and which are adapted to release safety appliances for the protection of the passengers such as for example an air bag 3 arranged near the steering wheel.

The control means 2 comprises a hydraulically activated part 4 co-operating with a receiving part 6 which activates release means 5 for the air bag 3 and is mounted on a part of the vehicle structure which is subjected to deformation on impact or collision of the vehicle.

The activated part 4 comprises principally a casing 7 filled with hydraulic fluid and a piston 8 capable of axial displacement in the casing and adapted to be moved at a deformation velocity $v$ corresponding to the force of impact of the vehicle. The fluid pressure set up in the compression space 9 in front of the piston 8 as a result of throttling on reaching a predetermined minimum value activates via the receiving part 6 the release means 5 for the air bag 3.

Figure 2:
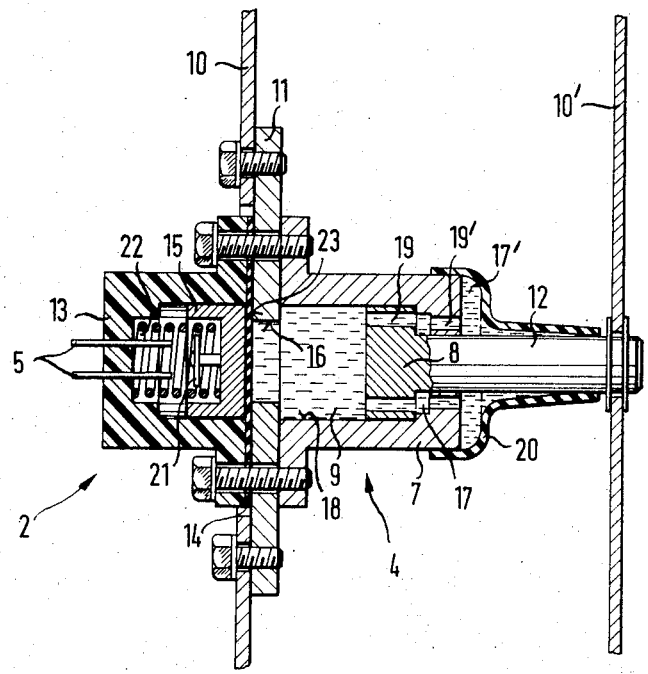
FIG. 2 shows a section through the control means in the installed condition.
Figure 3:
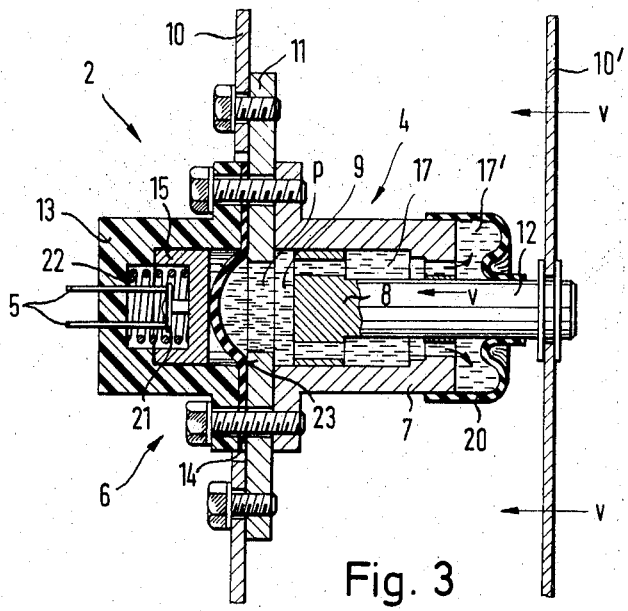
FIG. 3 shows a similar sectional view of the control means after impact of the vehicle.

In the constructional form according to FIGS. 2 and 3, the control means 2 is secured between two vehicle parts 10 and 10' which are displaced relatively to each other with a displacement velocity $v$ on impact of the vehicle. The activating part 4 and the receiving part 6 are mounted on the vehicle part 10 with the interposition of a support plate 11. The piston rod 12 which projects axially out of casing 7 of the activating part 4 on the other hand is connected with vehicle part 10'. It is however, not necessary that the piston rod 12 is bodily connected to any part of the vehicle.

A membrane or the like 14 is arranged between support plate 11 and casing 13 of the receiving part 6. This membrane or the like co-operates on the one hand with a contact-carrying member 15 which is axially movable in a recess in casing 13 and on the other hand with the hydraulic fluid in the activating part 4 through an opening 6 in the support plate 11.

In the normal position of the control means that is in the state in which they are installed in the vehicle (shown in FIG. 2) the compression space 9 is located between the face of the piston 8 and membrane 14, and equalising spaces 17 and 17' are located on the other side of the piston. The compression space 9 which is defined by the casing wall 18 of the control means, the membrane 14 and the face of piston 8, communicates via throttling bore holes 19 with the equalising space 17 located behind piston 8 and this space 17 in turn communicates via further bore holes 19' in the end wall of casing 7 with a second equalising space 17'. The second equalising space 17' is defined by piston rod 12, the outer end wall of casing 7 and a sleeve, bellows or the like 20 establishing a seal between casing 7 and piston rod 12.

Instead of throttling bore holes 19 in piston 8, equivalent throttling channels, passages or the like may be located in the wall of casing 7.

In the constructional form shown in the drawings, the casing 13 of the receiving part 6 is made from non-conducting material whilst the contact-carrying member 15 is provided with a contact bridge piece 21 from electrically conducting material. Release contacts 5 for the safety appliance, ie. the air bag, are provided in casing 13 and are adapted to co-operate with the contact making bridge piece 21. The member 15 which is axially movably arranged in a recess of the casing is forced against membrane 14 by one end of a helical spring 22 which with its other end bears against the inside end wall of casing 13, with the annular area 23 acting as abutment as will be seen from FIG. 2.

The control means according to the invention operate in the following manner:

On impact of the vehicle with an obstacle or other vehicle, the vehicle part 10' is displaced towards vehicle part 10 with a deformation velocity $v$ (FIG. 3). This movement is transmitted by piston rod 12 to piston 8 which then forces an amount of liquid corresponding to the displacement of the piston from compression space 9 via throttling bore holes 19 and 19' into equalising spaces 17 and 17' respectively. The elasticity of sleeve or bellows 20 permit of enlargement of equalising space 17' to receive the volume of fluid forced thereinto. During this displacement, as a result of the resistance to the fluid flow set up by throttling bore holes 19 and 19', a back pressure $p$ is set up in the compression space 9. When this back pressure p reaches a predetermined minimum value, it overcomes the pressure exerted by spring 22 in the receiving part 6 and the contact-carrying member 15 is forced against release contact 5, as shown in FIG. 3, by the bulge formed in membrane 14. The release contacts 5 are thus short-circuited and release mechanism (which are not further illustrated) initiate release of the safety appliance ie. inflation of the air bag. The minimum pressure or limiting value which effects short-circuiting of the release contact 5 corresponds to the velocity below which the protective system is not set into operation.

The pressure $p$ in the compression space 9 is proportional to piston velocity $v$. It will be seen that as a result the release time from the moment of impact and beginning of displacement of piston 8, to the closing of release contacts 5 is reduced as the velocity of impact increases.

Malfunction of the control means in the position of rest, that is during normal travel or movement of the vehicle, is made impossible as the initial compressive force of spring 22 is substantially greater than the maximum forces of inertia of member 15 carrying contact bridge 21 which can be set up as a result of acceleration of the vehicle.

We claim:

1. Control means for the release of safety appliances for the protection of passengers in motor vehicles, comprising a fixed vehicle part, a movable vehicle part adapted to be impacted, an activating part filled with hydraulic fluid disposed between said vehicle parts, a piston capable of axial displacement in the activating part, a piston rod establishing a connection between said piston and said movable vehicle part, a support plate attached to the fixed vehicle part, a receiving part, a membrane disposed between the support and the receiving part, a contact carrying member axially movable in the receiving part, a first equalising space located between the piston and the activating part on the side of the piston rod, a compression space on the other side of the piston rod, throttling bores establishing communication between the compression space and the first equalising space, a second equalising space, bore holes communicating between said first and second equalising spaces, the arrangement being such that on impact with an obstacle, the movable vehicle part is displaced towards the fixed vehicle part and this movement is transmitted via piston rod to piston to force fluid from the compression space via said throttling bores into said equalising spaces to set up a back pressure, which when it reaches a predetermined minimum value causes movement of the contact carrying member to establish a short circuit and initiate release of the safety appliances.

* * * * *